(12) United States Patent
Matonti et al.

(10) Patent No.: US 11,253,769 B2
(45) Date of Patent: Feb. 22, 2022

(54) BATTING TRAINING SYSTEMS AND METHODS

(71) Applicants: Gregory Carmelo Matonti, Saddle River, NJ (US); Joe Clemente, New City, NY (US); Rodolfo Fermin, Moonachie, NJ (US)

(72) Inventors: Gregory Carmelo Matonti, Saddle River, NJ (US); Joe Clemente, New City, NY (US); Rodolfo Fermin, Moonachie, NJ (US)

(*) Notice: Subject to any disclaimer, the term of this patent is extended or adjusted under 35 U.S.C. 154(b) by 69 days.

(21) Appl. No.: 16/894,613

(22) Filed: Jun. 5, 2020

(65) Prior Publication Data
US 2021/0379470 A1 Dec. 9, 2021

(51) Int. Cl.
*A63B 71/06* (2006.01)
*A63B 69/00* (2006.01)

(52) U.S. Cl.
CPC ...... *A63B 71/0622* (2013.01); *A63B 69/0002* (2013.01); *A63B 69/0075* (2013.01); *A63B 71/0605* (2013.01); *A63B 2069/0008* (2013.01); *A63B 2071/0625* (2013.01); *A63B 2220/62* (2013.01); *A63B 2225/50* (2013.01)

(58) Field of Classification Search
CPC ............ A63B 71/0622; A63B 71/0605; A63B 69/0002; A63B 69/0075; A63B 2220/62; A63B 2071/0625; A63B 2069/0008; A63B 2225/50
USPC .................................................. 473/451, 422
See application file for complete search history.

(56) References Cited

U.S. PATENT DOCUMENTS

| | | | | |
|---|---|---|---|---|
| 4,545,576 A | * | 10/1985 | Harris | A63B 69/00 340/323 R |
| 4,563,005 A | * | 1/1986 | Hand | A63B 63/00 273/371 |
| 4,657,250 A | * | 4/1987 | Newland | A63B 63/00 473/432 |
| 4,834,375 A | | 5/1989 | Elstein et al. | |
| 5,479,008 A | * | 12/1995 | Nishiyama | A63B 24/0021 250/222.1 |
| 5,868,578 A | * | 2/1999 | Baum | A63B 69/00 434/247 |
| 6,709,351 B2 | * | 3/2004 | Hori | A63B 69/40 473/455 |
| 7,575,526 B2 | * | 8/2009 | Husband | A63B 24/0021 473/422 |
| 7,892,116 B2 | | 2/2011 | Kellogg | |
| 9,700,777 B2 | | 7/2017 | Dilz, Jr. | |
| 10,987,567 B2 | * | 4/2021 | Cherryhomes | A63B 71/0622 473/453 |
| 10,994,187 B2 | * | 5/2021 | Cherryhomes | A63B 69/0002 473/453 |
| 2007/0021242 A1 | | 1/2007 | Krickler | |
| 2014/0274486 A1 | | 9/2014 | Thurman | |
| 2015/0019135 A1 | * | 1/2015 | Kacyvenski | G09B 19/0038 702/19 |
| 2017/0216695 A1 | * | 8/2017 | Schlagenhauf | G04F 8/006 473/451 |
| 2018/0361202 A1 | | 12/2018 | LoDuca | |

* cited by examiner

*Primary Examiner* — Mitra Aryanpour
(74) *Attorney, Agent, or Firm* — Kelley Drye & Warren LLP (57) ABSTRACT

Batting practice systems and methods that allow a baseball batter to match the timing of the batter's swing to the pitch speed of a pitcher.

18 Claims, 5 Drawing Sheets

BATTING TRAINING SYSTEMS AND METHODS

FIELD OF THE INVENTION

This invention relates to the field of athletic training and, more particularly, to simulation of sport conditions to improve performance.

BACKGROUND OF THE INVENTION

Hitting a baseball pitched by a major league pitcher is considered one of the most difficult feats to achieve in professional sports. A regulation baseball is less than three inches in diameter, with a circumference of approximately nine inches. Both the bat and the ball are round, allowing for a very limited point of contact. Pitches thrown by professional pitchers can exceed speeds of 90 miles per hour. Also, pitchers may throw one of a variety of pitches that may cause the ball to curve in the air and/or travel at a speed substantially slower than the maximum speed that the pitcher can pitch the ball. Regardless of the type of pitch, however, the set distance between the pitching mound and the strike zone at home plate is traversed by a pitched baseball in under a couple of seconds.

When the ball is thrown, the stitching that holds together the covering of the ball catch the air and may cause the ball to swerve. The direction and extent of the swerve depends on in which direction, and how fast, the stitches are made to spin by the pitcher. Exemplary pitches are referred to by names such as "curveball," "slider," "fastball," "sinker," and "cutter.

Figure 1:
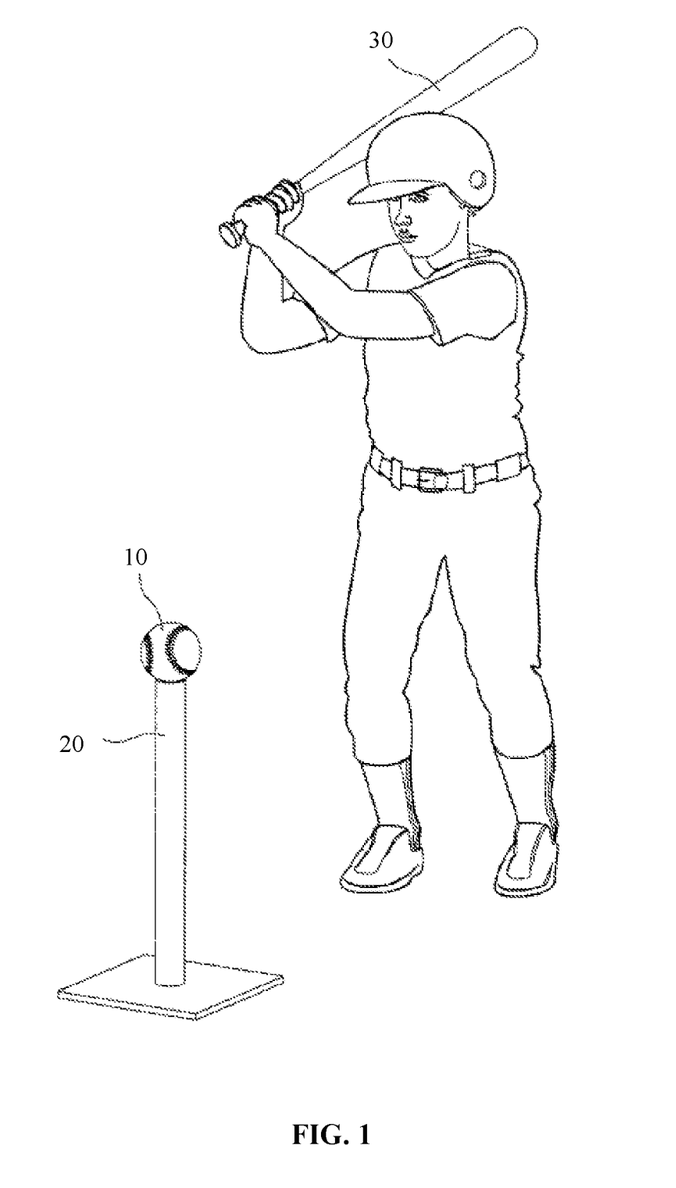
FIG. 1 depicts a batter and a batting tee.

A batter's swing timing is one of the critical factors, if not the most critical factor, that determines whether the batter will hit a pitched ball. As shown in FIG. 1, a batter may practice swinging a bat (30) to hit a ball (10) from a tee (20). However, practicing swinging at a stationary ball does not alone help a batter match his timing to the speed of a pitched ball. A batter may also practice hitting balls launched by a ball machine or thrown by a pitcher on their own team, but unless the speed of the ball matches the speed of pitches to be thrown by an opposing pitcher, the batter may still not be able to match the timing of their swing to the pitches thrown by an opposing pitcher.

SUMMARY OF THE INVENTION

The present invention is directed to improved devices for athletic training.

The invention provides information to a batter concerning the timing of pitches so the batter can anticipate a pitch and improve their chance of striking a pitched ball during a baseball game.

It is an object of the present invention to allow a baseball player to match their batting swing timing to the pitch speed of a particular pitcher's pitches.

Numerous variations may be practiced in the preferred embodiment.

BRIEF DESCRIPTION OF THE DRAWINGS

A further understanding of the invention can be obtained by reference to exemplary embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description. Like reference numbers generally refer to like features (e.g., functionally similar and/or structurally similar elements).

The drawings are not necessarily depicted to scale; in some instances, various aspects of the subject matter disclosed herein may be shown exaggerated or enlarged in the drawings to facilitate an understanding of different features. Also, the drawings are not intended to limit the scope of this invention, which is set forth with particularity in the claims as appended hereto or as subsequently amended, but merely to clarify and exemplify the invention.

DETAILED DESCRIPTION OF THE INVENTION

The invention may be understood more readily by reference to the following detailed descriptions of embodiments of the invention. However, techniques, systems, and operating structures in accordance with the invention may be embodied in a wide variety of forms and modes, some of which may be quite different from those in the disclosed embodiments. Also, the features and elements disclosed herein may be combined to form various combinations without exclusivity, unless expressly stated otherwise. Consequently, the specific structural and functional details disclosed herein are merely representative. Yet, in that regard, they are deemed to afford the best embodiments for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Use of the term "exemplary" means illustrative or by way of example, and any reference herein to "the invention" is not intended to restrict or limit the invention to the exact features or steps of any one or more of the exemplary embodiments disclosed in the present specification. Also, repeated use of the phrase "in one embodiment," "in an exemplary embodiment," or similar phrases do not necessarily refer to the same embodiment, although they may. It is also noted that terms like "preferably," "commonly," and "typically," are not used herein to limit the scope of the claimed invention or to imply that certain features are critical, essential, or even important to the structure or function of the claimed invention. Rather, those terms are merely intended to highlight alternative or additional features that may or may not be used in a particular embodiment of the present invention.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise.

Indeed, the steps in such processes or methods generally may be carried out in various different sequences and arrangements while still falling within the scope of the present invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Figure 2:
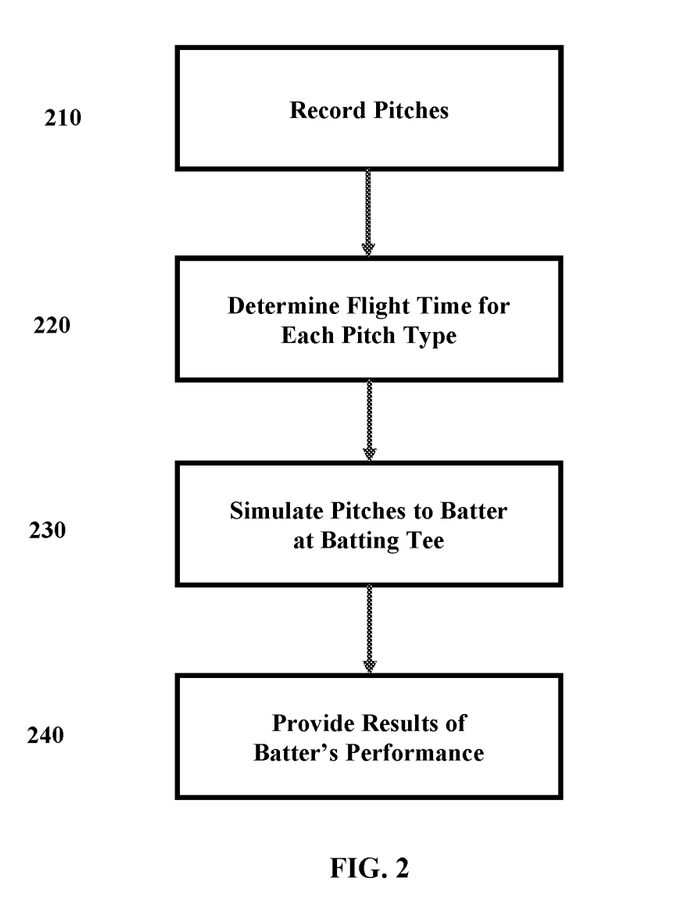
FIG. 2 is a flowchart depicting a method in accordance with the present invention.

FIG. 2 is a flow chart depicting an exemplary method according to the present invention. At Step 210, information concerning pitches of a particular baseball pitcher may be collected. For example, if one baseball team is scheduled to play an opposing team in in an upcoming game, the performance of the opposing team's pitcher (or pitchers) may be observed during a prior game against a third team.

For each pitch that the pitcher throws, information may be collected concerning the type of pitch (e.g., fastball pitch, curve ball pitch, slider pitch), the speed of the pitch, the elapsed time between the start of the pitcher's wind up and when the ball crosses home plate, and/or the elapsed time between when the ball is released from the pitcher's hand and when the ball crosses home plate. The information may be recorded, for example, using an electronic device such as a smartphone. The term "smartphone" as used herein includes mobile devices having a microprocessor, non-transitory memory, a touch screen, and a microphone, such as mobile phones currently sold by Apple Inc. and Samsung Electronics Co. Unless stated otherwise, use of the term "smartphone" herein is also meant to refer to other electronic devices such as tablets that have a microprocessor, non-transitory memory, a touch screen, and optionally a microphone and/or speaker.

Each time a pitcher throws a pitch, the user of an electronic device may record on the device information concerning the pitch. The user may provide one or more inputs to the device indicating, for example, the time at which each ball is released from the pitcher's hand, and/or the time at which the ball crosses home plate. Software stored in, for example, non-transitory memory on the device and run by a processor of the device may detect when the user taps a touch screen of the device. Tapping the screen may cause the software to record the time at which the ball is released from the pitcher's hand. Additionally or alternatively, tapping the screen may cause the software to record the time at which the ball crosses home plate, or the elapsed time between when the ball was released from the pitcher's hand and the time at which the ball crosses home plate.

Additionally or alternatively, the time at which the ball is struck by a bat or hits the catcher's glove may be detected from the sound made by those points of contact via a microphone in the device. Additionally or alternatively, the elapsed time between when the ball was released from the pitcher's hand and the time the sound is detected may be recorded on the device. Because sounds travels slower than light, if the device is located at a considerable distance far from home plate, the time at which the device detects the sound from a bat or catcher's glove contacting a ball may occur at some time after the time at which the ball actually makes contact with the bat or the catcher's glove. That delay can be accounted for if the approximate distance between the device and home plate is known. The distance between the device and home plate may be approximated by the user of the device. Alternatively, the distance between the device and home plate may be determined by the mobile application using the camera in the device and software capable of approximating distances. Once the distance or approximate distance to home plate is determined, the time for sound to travel that distance may be calculated by dividing that distance by the speed of sound. The time for sound to travel the distance between the device and home plate may be subtracted from the time at which the sound of the point of contact is detected by the device to determine a more accurate time for the point of contact.

The device may determine whether the detected point of contact is the ball hitting a bat or the ball hitting a glove based on a characteristic of the sound, such as the pitch of the sound. Additionally or alternatively, the user may provide an input to the device indicating whether the ball was hit by a bat or whether it was caught by the catcher. Since a catcher is positioned behind home plate and a ball hit by a bat is typically stricken above home plate, a ball caught by a catcher typically travels further than a ball hit by a bat. As described further below, if the speed of the pitch is to be determined from the flight time of the pitch and the distance that the pitch travels, the additional distance traveled by a ball caught by a catcher may be accounted for when determining the speed of the pitch.

Each pitch may also be video recorded using an electronic device. For example, the video recording may be performed using the camera on a smartphone, tablet, or similar devices, and the video recording may be stored in non-transitory memory in the device and/or on a remote server such as an internet server. A software application in accordance with the present invention, installed and saved in non-transitory memory on the device, may be used to video record each pitch and collect additional information concerning each pitch. While recording, the device may receive input from a user of the device indicating, for example, the times at which the ball is released from the pitcher's hand and when the ball crosses home plate. Those inputs may be associated with the corresponding times of the video recording. For example, while recording video of a pitch, the user may tap on the screen to indicate the time at which the ball is released from the pitcher's hand and/or tap on the screen to indicate the time at which the ball crosses home plate. If the video is played back, for example on a display of the device, on another device, on a monitor, or projected onto a free standing screen, the playback may indicate the times at which one or more inputs were received during recording of the video. For example, a signal, icon, tone, or other visual and/or audio cue may indicate when the one or more inputs were received.

Alternatively, other methods may be used to record information from which the flight time of a pitch may be determined. For example, motion software installed on a device may be used to determine the time at which the ball is released from the pitcher's hand. For example, existing software may be used to detect the ball as it leaves the pitcher's hand and record that time, either with respect to a video recording or simply the exact time of day.

Alternative, the speed of each pitch may be determined using known methods such as measuring the speed of a ball with a radar gun. Because the distance between the pitching mound and home plate is a fixed distance, the flight time between the pitcher and home plate may be calculated by dividing that distance by the speed of the pitch. If the speed of the pitch is provided to the electronic device, software installed on the device may make that calculation.

Because pitchers often throw the same sequence of pitch types in each game, practicing with a known sequence of pitches can further help a batter prepare to face the pitcher. The order of the types of pitches thrown by the pitcher (e.g., fastball, fastball, curveball, fastball) may be recorded. For example, the order of the pitcher's first five pitches, first ten pitches, and/or any other sequence of pitches may be recorded. Alternatively, the order of all pitches thrown in a game may be recorded.

At Step 220 of FIG. 2, the elapsed time between when the pitcher releases the ball and when the ball crosses home plate (i.e., the "flight time") may be determined for each pitch, and an average flight time may be determined for each pitch type. The flight time for each pitch may be determined by subtracting the time between when the pitcher releases the ball and when the ball crosses home plate. The times when the pitcher releases the ball and when the ball crosses home plate may be determined using one of the methods described above.

If the inputs to the device include the times at which the pitcher releases the ball and the time at which the ball makes contact with the catcher's glove, the elapsed time between when the pitcher releases the ball and when the ball crosses home plate may be calculated based on those inputs. For example, the distance between home plate and the catcher's glove may be estimated. The estimated distance may be a particular distance, for example, between two feet and four feet. That distance may be approximated and entered to the device for each pitch, or an average value may be used for one or more pitches. The distance between home plate and the catcher's glove may be added to the distance between the pitcher and home plate to determine the total time that the pitch travels when the catcher catches the pitch (i.e., when the batter does not swing at the pitch, or when the batter swings at the pitch but misses the ball). The speed of the pitch may then be determined by dividing the distance between the pitcher and the catcher's glove by the elapsed time between when the ball was released by the pitcher and when the pitch was caught by the catcher. The elapsed time between when the ball was released by the pitcher and when the ball crossed home plate may be calculated by dividing the distance between the pitcher and home plate by the speed of the pitch.

To account for variation in pitch speed and/or because a pitch may be hit slightly "early" (i.e., just in front of the center of home plate assuming the batter's body is aligned with the center of home plate) or slightly "late" (i.e., just behind the center of home plate) and still be hit in fair territory, a hitting time range may be established around the flight time of a pitch or the average flight time of a pitch type. For example, an upper hitting time may be calculated by adding a first period of time to the flight time (or average flight time), and a lower hitting time may be calculated by subtracting a second period of time from the flight time (or average flight time). The first period of time may be the same duration as the second period of time. The time frame between the upper hitting time and the lower hitting time is referred to herein as the hitting time range, e.g., the time frame in which a ball hit by the batter would be hit into fair territory.

Figure 3:
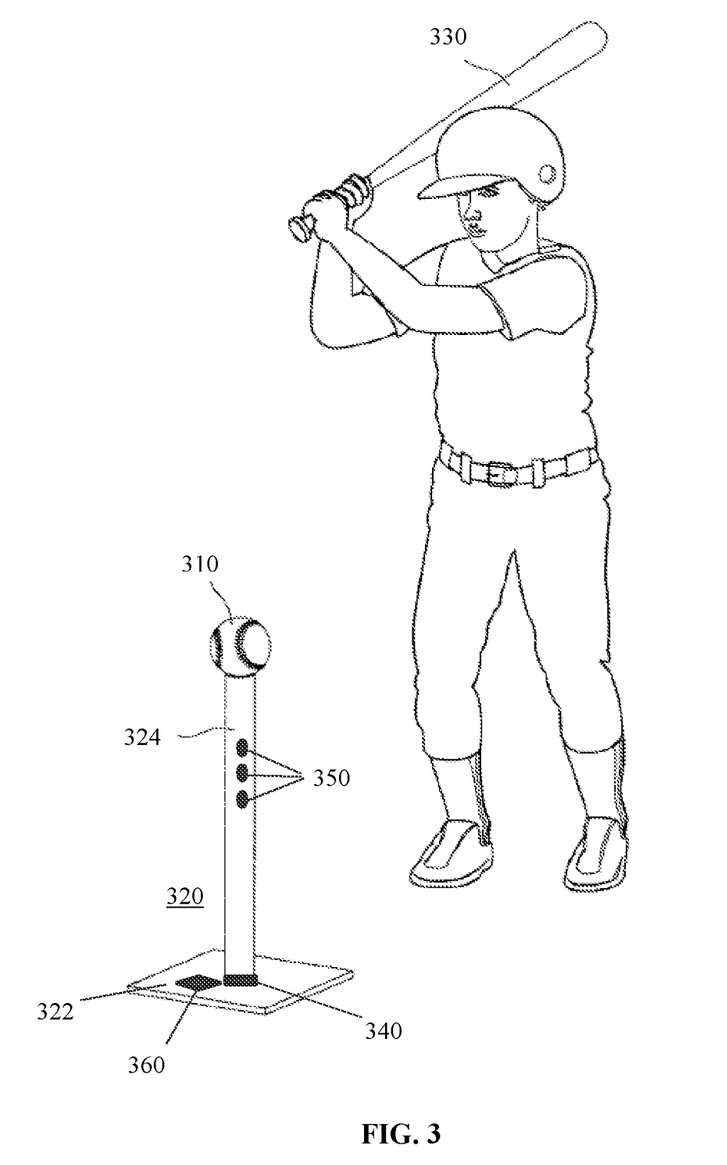
FIG. 3 depicts a batter and a batting tee in accordance with the present invention.

At Step 230, the pitches may be simulated to a batter. As shown in FIG. 3, a tee (320) and bat (330) may be provided to the batter. Tee (320) may have a base (322) and a post (324) attached to base (322). Tee (320) may further include one or more processors and non-transitory memory in electronic communication with the one or more processor. Machine executable code may be stored in the non-transitory memory and executed by the one or more processors to perform the functions described herein. Tee (320) may further include one or more wireless receivers and/or transmitters in electronic communication with the processor, such as a Bluetooth transceiver, a W-Fi transceiver, and/or an infrared transceiver. Additionally or alternatively, tee (320) may further include a wired data portal transmitters in electronic communication with the processor, such as a USB port.

Information collected at Step 210 discussed above, including information concerning pitches of a particular baseball pitcher, may be transmitted to the processor in tee (320) by wired or wireless transmission and stored in non-transitory memory of tee (320). Also, one or more processors in tee (320) may be used to determine the flight time for pitches and average flight times for each pitch type for Step 220 discussed above.

A ball (310) may be placed on top of post (324) of tee (320). Preferably the batter would be positioned relative to tee (320) at the same distance from and orientation to the tee as the batter would stand relative to home plate. Ball (310) may be attached to the top of post (324), may be tethered to tee (320) by, for example a string, or may simply rest on top of post (324).

A sensor in electronic communication with the processor may be included on tee (320) to sense when the ball is hit by bat (330). If ball (310) is placed on, but not attached to post (324), a sensor may sense whether the ball moves from its starting position on post (324) when the batter swings bat (330). For example, a sensor having a spring-loaded switch at the top of post (324) may be depressed from a starting position to a second position when ball (310) is placed on post (324). When ball (310) departs from post (324), the switch may return to the starting position, generating a signal that may be used to determine when ball (310) is struck by bat (330). Additionally or alternatively, a sensor (e.g. radar) may be used to determine the velocity of ball (310) as it leaves tee (320).

If the ball is attached to post (324), post (324) may bend/fold relative to base (322), i.e., from a vertical position to a second position, when bat (330) strikes ball (310). For example, post (324) may be connected to base (322) by hinge (340) at the base of post (324). When ball (310) is struck by bat (330), post (324) may rotate about hinge (340). A sensor in or attached to tee (320) may sense movement of post (324) and may generate a signal that may be used to determine when ball (310) is struck by bat (330). Signals from the sensors discussed above may be communicated to the processor and/or stored in memory of the tee.

Figure 4:
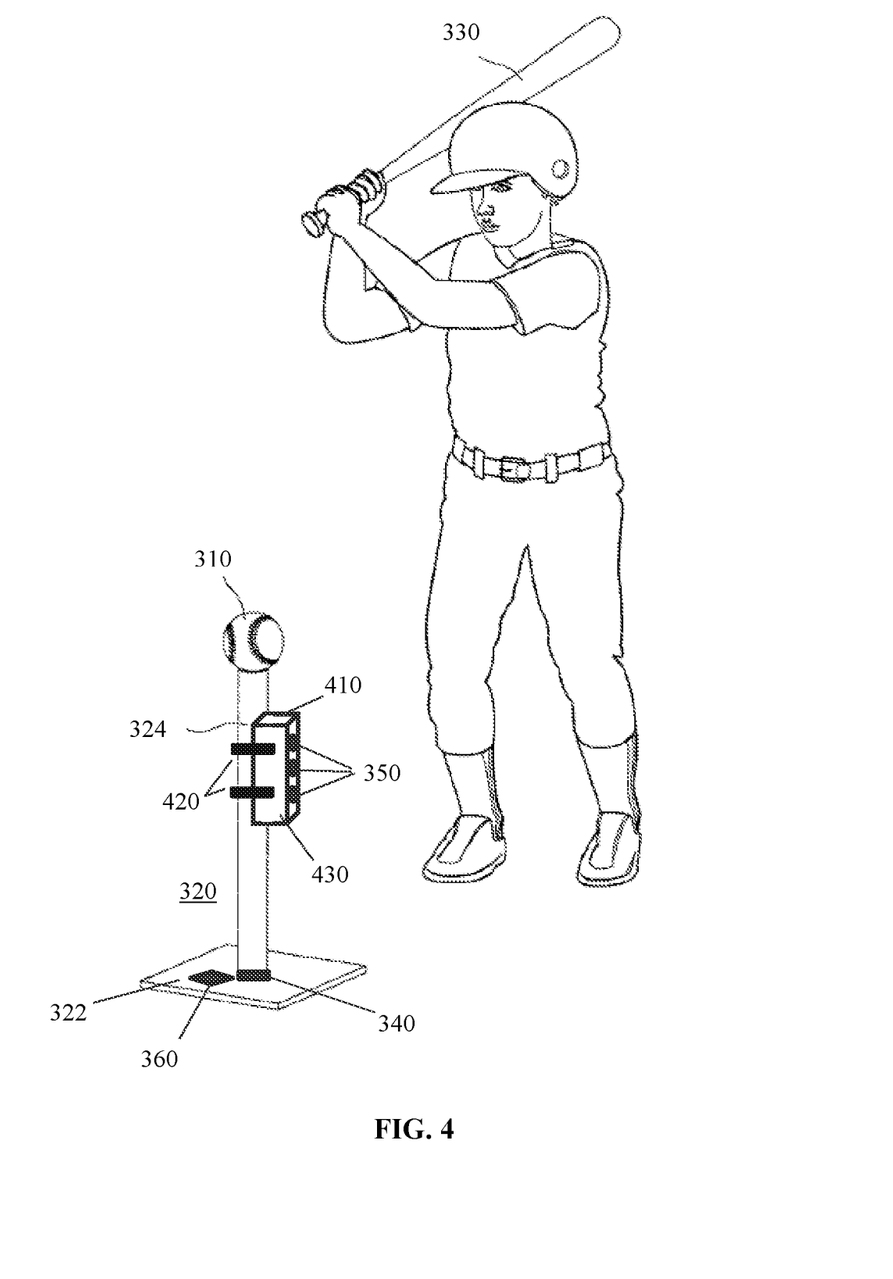
FIG. 4 depicts a batter and a batting tee in accordance with the present invention.
Figure 5:
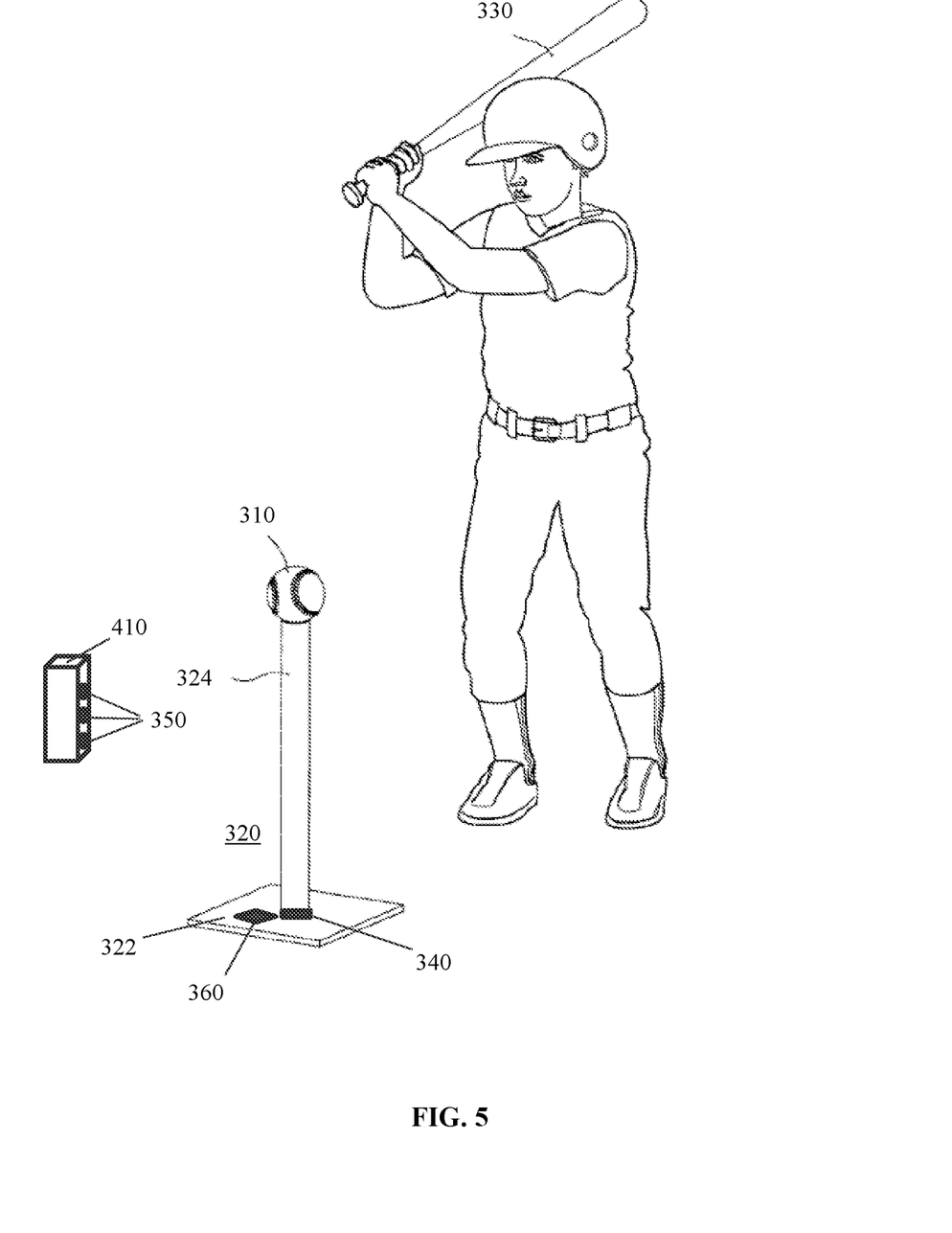
FIG. 5 depicts a batter and a batting tee in accordance with the present invention.

As shown in FIG. 3, one or more visual indicators (350) may be located on post (324). Additionally or alternatively, the one or more visual indicators (350) may be located on base (322). Additionally or alternatively, the one or more visual indicators (350) may be located on an electronic device (410) that may be detachably connected or non-detachably connected to tee (320). As shown in FIG. 4, electronic device (410) may have a housing (430) and may be attached to post (324) by, for example, one or more straps (420). Straps (420) may be attached to post (324) and wrap around electronic device (410). Additionally or alternatively, straps (420) may be attached to electronic device (410) and wrap around post (324). Additionally or alternatively, electronic device (410) may be attached to tee (320) either on post (324) or base (322) by, for example, snaps, screws, hook-and-loop material, one or more adhesives, a bayonet connection, one or more magnets, string, or a slotted connection. As shown in FIG. 5, electronic device (410) may alternatively be placed apart from the tee but in view of the batter.

Electronic device (410) may include one or more processors, non-transitory memory, a display screen, and/or one or more speakers. Electronic device (410) may further include one or more wireless receivers and/or transmitters in electronic communication with the one or more processors, such as a Bluetooth transceiver, a W-Fi transceiver, and/or an infrared transceiver. Additionally or alternatively, electronic device (410) may further include a wired data portal such as a USB port in electronic communication with the one or more processors. Machine executable code may be stored in non-transitory memory in electronic device (410) and executed by the one or more processors in electronic device (410) to perform the functions described herein.

Electronic device (410) may be the same device used to video record the pitches and/or record information about the pitches at Step 210. Information collected at Step 210 discussed above, including information concerning pitches of a particular baseball pitcher, may be stored in non-transitory memory of electronic device (410). Also, the processor of electronic device (410) may be used to determine the fight time for pitches and average flight times for each pitch type for Step 220 discussed above.

Electronic device (410) may be electronically connected to tee (320), either by a wired port (e.g., USB) on tee (320) or by a wireless connection to tee (320) (e.g., Bluetooth, Wi-Fi, infrared). Via the wired port and/or a wireless connection, information may be transmitted between memory in tee (320) and memory in electronic device (410) for use by one or more processors in tee (320) or one or more processors in electronic device (410) to perform the functions described herein.

When simulating a pitch to a batter, one or more processors located in tee (320) or electronic device (410) may provide a signal to one or more visual indicators (350) to indicate to the batter the type of pitch. If a signal is provided from one or more processors located in tee (320) to one or more visual indicators (350) located on electronic device (410), the signal may be sent from tee (320) to electronic device (410) by a wired connection or wirelessly, such as by from a Bluetooth or Wi-Fi transmitter or transceiver in tee (320) to a Bluetooth or Wi-Fi receiver or transceiver in electronic device (410). Conversely. if a signal is provided from one or more processors located in electronic device (410) to one or more visual indicators (350) located on tee (320), the signal may be sent from electronic device (410) to tee (320) by a wired connection or wirelessly, such as by from a Bluetooth or Wi-Fi transmitter or transceiver in electronic device (410) to a Bluetooth or Wi-Fi receiver or transceiver in tee (320).

Visual indicators (350) may be, for example, incandescent lightbulbs or LEDs. One or more visual indicators (350) may each emit light to signal information about a pitch. For example, one or more visual indicators (350) may indicate the type of pitch to be simulated. A visual indicator (350) may be capable of emitting multiple colors of light. The color of light emitted from a visual indicator (350) may correspond to the type of pitch to be simulated (e.g., fastball, curveball, slider). Additionally or alternatively, one or more visual indicators (350) may illuminate a word template indicating the type of pitch to be simulated. Additionally or alternatively, one or more visual indicators (350) may be a display screen such as an LCD screen.

The processor may also send a signal to one or more visual indicators (350) to indicate to the batter information about the pitch state. For example: (1) a red light may indicate that the batter should stand ready for a pitch; (2) a yellow light may indicate the time at which a simulated pitcher releases the ball toward the batter; and/or (3) a green light may indicate the time at which the batter should make contact with the ball. The lights may be generated by one or more light sources capable of emitting multiple colored lights. Also, the signal indicating the pitch type may also be the signal indicating a pitch state. For example, instead of the yellow light described above indicating the time at which a simulated pitcher releases the ball, a light source capable of emitting multiple colors may signal to the batter the type of pitch released by the pitcher based on the color of the light.

The timing between illumination of the lights may correspond to different pitch types and/or pitchers according to information stored in non-transitory memory of the tee (320) or electronic device (410). In the example described above, the timing between illumination of the yellow light and illumination of the green light may be adjusted to account for different speeds of pitches thrown by a particular pitcher, or to account for different pitch speeds associated with different pitchers. For example, the timing of the lights can be programmed to match an opposing pitcher that the batter will face in a real baseball game. A series of pitches having varied pitch types (e.g., fastball, fastball, curveball, fastball) may also be simulated according to, for example, the typical order of pitches that the opposing pitcher throws.

One or more speakers (360) may also be included as part of tee (320), and/or as part of electronic device (410) that is either attached to tee (320) or placed in proximity to the batter. In addition to or as an alternative to the visual indicators (350) described above, sound generated by the one or more speakers (360) may signal the pitch type to be simulated or information about the pitch state, such as when the batter should stand ready for a pitch, the time at which a simulated pitcher releases the ball toward the batter, and/or the time at which the batter should make contact with the ball.

At Step 240, feedback may be provided to the batter concerning the extent to which the batter's swing was timed as desired. For example, a processor in tee (320) or electronic device (410) may cause one or more visual indicators (350) to generate a visual signal (e.g. light or indication on a display screen) and/or cause a speaker to generate an audible signal (e.g. sound generated by one or more speakers) that may indicate to the batter whether the time at which ball (310) is struck matches, is prior to, or is after the time at which the simulated pitch crosses home plate. Additionally or alternatively, a visual signal and/or an audible signal may indicate whether the time at which ball (310) is struck falls within, before, or after the hitting time range. Feedback may be provided to the batter after each simulated pitch and/or after a series of pitches. Information concerning the batter's performance may also be transmitted to an electronic device (e.g., a mobile phone) in proximity to tee (320) by, for example a Bluetooth protocol, or to a remote device on a network.

Additionally or alternatively, video recorded of the pitcher pitching may be displayed to the batter during simulation of the pitches. The video may be displayed on a display screen incorporated in the device that recorded the video, on the display screen of a different device, or may be projected on a vertical surface such as a wall or a projector screen. The visual and/or audible signals described above may be provided to the batter at the times corresponding to the signals provided. For example, a light indicating the time when the ball leaves the pitcher's hand may be illuminated at the time that the video shows the ball leaving the pitcher's hand.

While the invention has been described in detail with reference to embodiments for the purposes of making a complete disclosure of the invention, such embodiments are merely exemplary and are not intended to be limiting or represent an exhaustive enumeration of all aspects of the invention. It will be apparent to those of ordinary skill in the art that numerous changes may be made in such details, and the invention is capable of being embodied in other forms, without departing from the spirit, essential characteristics, and principles of the invention. Also, the benefits, advantages, solutions to problems, and any elements that may allow or facilitate any benefit, advantage, or solution are not to be construed as critical, required, or essential to the invention. The scope of the invention is to be limited only by the appended claims.

What is claimed is:

1. A method for matching the reaction timing of a baseball batter's swing to the speed of one or more pitches, comprising:
   video recording a pitcher throwing one or more pitches of a ball;
   saving the recorded video to a non-transitory memory of a first device;
   for each pitch recorded, providing to a processor of the first device a first input indicating a release time at which the ball leaves the pitcher's hand, a second input indicating an arrival time at which the ball reaches a predetermined location, and a third input indicating the type of pitch thrown;
   determining the flight time of each pitch recorded by calculating the difference between the release time and the arrival time;
   for each type of pitch thrown, determining an average flight time based on the calculated flight times of each pitch corresponding to that type of pitch;
   for each of one or more types of pitches, determining a hitting time range between an upper hitting time and a lower hitting time wherein the upper hitting time is calculated by adding a first predetermined period of time to the average flight time, and the lower hitting time is calculated by subtracting a second predetermined period of time from the average flight time;
   providing to the baseball batter a batting tee and a ball placed on the tee;
   simulating one or more pitches by, for each simulated pitch,
      at a first time providing a first signal to the batter indicating the type of pitch;
      determining a second time at which the batter strikes the ball on the tee;
      calculating an elapsed time by determining the difference between the first time and the second time; and
      providing to the baseball batter a second signal indicating whether the elapsed time is lower than the lower hitting time, higher than the upper hitting time, or between the lower hitting time and the upper hitting time.

2. The method of claim 1, wherein the first predetermined period of time equals the second predetermined period of time.

3. The method of claim 1, further comprising providing to the baseball batter a third signal indicating whether the elapsed time is higher or lower than the average flight time.

4. The method of claim 1, wherein the first signal is a first light emitted from a first light source.

5. The method of claim 4, wherein the first light source is capable of emitting more than one color.

6. The method of claim 5, wherein a plurality of pitch types are video recorded, a different light color is assigned to each pitch, and the color of the first light corresponds to one of the plurality of pitch types.

7. The method of claim 1, wherein the first device comprises a touch screen.

8. The method of claim 7, wherein the first input is provided by a user of the first device contacting the touch screen.

9. The method of claim 8, wherein the second input is provided by the user contacting the touch screen.

10. The method of claim 1, wherein the first input is provided by a software application running on the first device, wherein the software application is capable of detecting from the video recording when the ball leaves the pitcher's hand.

11. The method of claim 1, wherein the first device comprises a microphone, and the first input is generated as a result of a sound detected by the microphone.

12. The method of claim 11, wherein the sound comprises the sound of a bat hitting the ball.

13. The method of claim 11, wherein the sound comprises the sound of the ball hitting a baseball player's glove.

14. The method of claim 1, further comprising displaying the video recorded of the pitcher on a screen in view of the baseball batter.

15. The method of claim 14, wherein the first time is the time of the video at which the pitcher releases each ball.

16. The method of claim 1, wherein the video recording comprises a pitcher throwing a plurality of pitches; the order of the inputs indicating the type of each pitch thrown is saved; a plurality of pitches are simulated; and the order of the plurality of pitches is the same as the order of order of the inputs indicating the type of each pitch thrown.

17. The method of claim 16, further comprising displaying the video recorded of the pitcher on a screen in view of the baseball batter.

18. The method of claim 17, wherein the first time is the time of the video at which the pitcher releases each ball.

* * * * *